US006813262B1

(12) United States Patent
Lee et al.

(10) Patent No.: US 6,813,262 B1
(45) Date of Patent: Nov. 2, 2004

(54) SYNCHRONIZATION TRACKING DEVICE AND METHOD IN CODE DIVISION MULTIPLE ACCESS RECEIVER

(75) Inventors: Woo Jae Lee, Seoul (KR); Cheon Soo Yoon, Kyungki-do (KR)

(73) Assignee: Hyundai Electronics Ind. Co., Ltd., Kyoungki-Do (KR)

( * ) Notice: Subject to any disclaimer, the term of this patent is extended or adjusted under 35 U.S.C. 154(b) by 729 days.

(21) Appl. No.: 09/633,035

(22) Filed: Aug. 4, 2000

(30) Foreign Application Priority Data

Sep. 17, 1999 (KR) .................................... 1999-40167

(51) Int. Cl.[7] ................................................ H04B 7/16
(52) U.S. Cl. ...................... 370/342; 370/503; 379/149
(58) Field of Search ................................ 370/320, 335, 370/342, 503, 515; 375/149, 150, 130, 140, 142, 145, 147

(56) References Cited

U.S. PATENT DOCUMENTS

| | | | | |
|---|---|---|---|---|
| 5,844,935 A | * | 12/1998 | Shoji | 375/150 |
| 5,898,665 A | | 4/1999 | Sawahashi et al. | 370/342 |
| 5,953,327 A | | 9/1999 | Cox | 370/336 |
| 5,956,367 A | * | 9/1999 | Koo et al. | 375/149 |
| 6,188,679 B1 | * | 2/2001 | Sato | 370/335 |
| 6,212,223 B1 | * | 4/2001 | Okamoto | 375/150 |
| 6,272,168 B1 | * | 8/2001 | Lomp et al. | 375/222 |
| 6,370,397 B1 | * | 4/2002 | Popovic et al. | 455/561 |
| 6,377,614 B1 | * | 4/2002 | Yamashita | 375/149 |
| 6,404,758 B1 | * | 6/2002 | Wang | 370/342 |
| 6,549,559 B2 | * | 4/2003 | Kamgar et al. | 375/134 |
| 6,650,689 B1 | * | 11/2003 | Oishi et al. | 375/142 |

OTHER PUBLICATIONS

US 5,987,079, 11/1999, Scott et al. (withdrawn)

* cited by examiner

*Primary Examiner*—Ajit Patel
*Assistant Examiner*—Chirag Shah
(74) *Attorney, Agent, or Firm*—Bryan Cave LLP

(57) ABSTRACT

A synchronization tracking device and method in a code division multiple access (CDMA) receiver including oversampling received signals corresponding to a plurality of chips at a predetermined speed and sequentially storing the oversampled signals in a received signal shift register unit; sequentially storing pseudo noise codes generated in a pseudo noise code generator in a pseudo noise code shift register unit in a chip unit; correspondingly multiplying the output data from the received signal shift register unit and the pseudo noise codes outputted from the pseudo noise code shift register unit by means of a plurality of multipliers; adding the data outputted from the plurality of multipliers and storing the added result as the phase information and energy value for one path; repeatedly performing the above procedure until the phase information and energy values for all paths are stored; and selecting the path corresponding to a largest value in the stored phase information and energy values for all paths and informing a demodulator of the selected path. Thereby, the synchronization tracking device can reduce the time necessary for the synchronization tracking and continuously correct the information for a selected path, thereby improving the performance of the receiver.

5 Claims, 3 Drawing Sheets

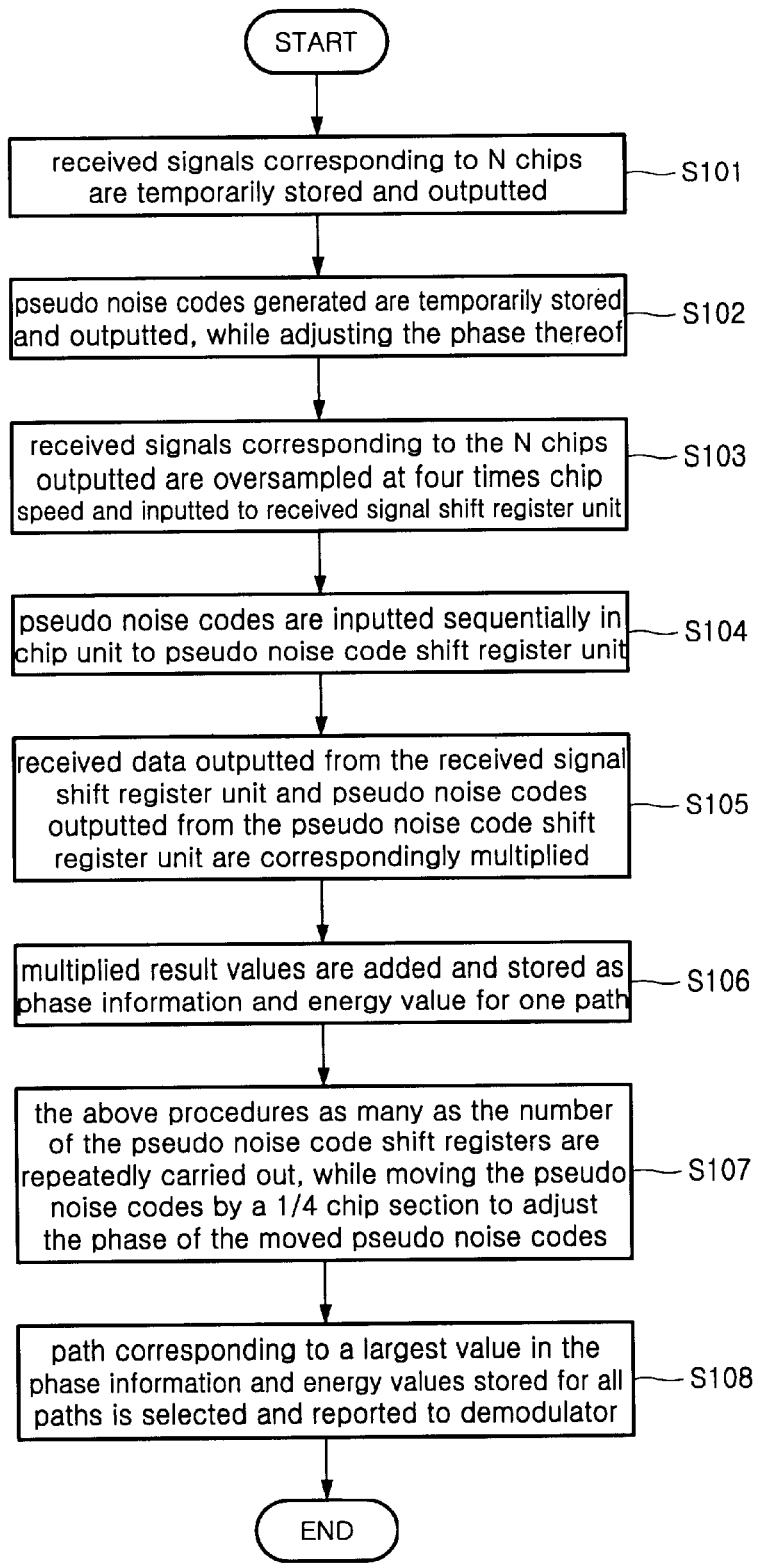

SYNCHRONIZATION TRACKING DEVICE AND METHOD IN CODE DIVISION MULTIPLE ACCESS RECEIVER

BACKGROUND OF THE INVENTION

1. Field of the Invention

The present invention relates to a synchronization tracking device and method in a code division multiple access (hereinafter, referred to as CDMA) receiver, and more particularly, to a synchronization tracking device and method in a CDMA receiver which is capable of obtaining channel tracking results and energy values for all paths existing within a time section corresponding to a delay profile during a synchronization tracking for an initial synchronization in a CDMA communication system to thereby carry out demodulation for a best path with the obtained result and continuously correcting the information of the corresponding path to thereby ensure a high performance of the receiver.

2. Discussion of Related Art

A CDMA communication system generally divides channels by a pseudo noise code and upon call opening, checks the pseudo noise code to conduct channel connection. The checking procedure for the pseudo noise code is classified into code recognition and synchronization tracking. Through the code recognition, the codes generated by the receiver itself are adjusted to have a variation in a range of a single chip with received signals and through the synchronization tracking, an accurate synchronization acquiring and tracking for the received signals are completed. Based upon the synchronization tracking result, the phase information and energy value for a specific path are obtained.

In a mobile radio communication environment, signals on a plurality of paths are naturally generated according to a channel characteristic, which is called a multiple path signal. So as to improve the performance of the receiver, a plurality of signals in the multiple path signals are demodulated and coupled. To this end, since the phase information and energy values for the plurality of multiple path signals should be required, the synchronization tracking for each path has to be carried out.

Now, an explanation of the construction and operation of a conventional synchronization tracking device in a CDMA receiver will be discussed.

FIG. 1 is a block diagram illustrating the construction of the conventional synchronization tracking device in the CDMA receiver.

A reference numeral 10 denotes a delay code generator for delaying a pseudo noise code generated in the receiver itself by a predetermined time δ, a reference numeral 30 represents a first multiplier for multiplying the received signal and the pseudo noise code generated in the delay code generator 10, a reference numeral 20 denotes a fast code generator for generating a fast pseudo noise code which is made by making the pseudo noise code generated in the receiver itself substantially fast by the predetermined time δ, and a reference numeral 40 represents a second multiplier for multiplying the received signal and the pseudo noise code generated in the fast code generator 20. Reference numerals 50 and 70 denote first and second band-pass filters for filtering the output signals from the first and second multipliers 30 and 40 to an arbitrary intermediate frequency, and reference numerals 60 and 80 denote first and second envelope detectors for detecting envelope values from the output signals filtered from the first and second band-pass filters 50 and 70. A reference numeral 90 represents a subtracter for subtracting the envelope value detected in the second envelope detector 80 from the envelope value detected in the first envelope detector 60, thereby outputting the subtracted result value. In addition, a reference numeral 100 denotes a loop filter for low-pass filtering the envelop difference signal outputted from the subtracter 90, and a reference numeral 110 represents a voltage controlled oscillator for outputting an arbitrary oscillating frequency in accordance with the filtered signal in the loop filter 100. A reference numeral 120 denotes a pseudo noise code generator for generating a pseudo noise code which is proportional to the phase of the oscillating frequency outputted from the voltage controlled oscillator 110, a reference numeral 130 represents a local oscillator for generating an arbitrary local frequency for adjusting the phase of the pseudo noise code generated in the pseudo noise code generator 120, and a reference numeral 140 denotes a mixer for mixing the pseudo noise code generated in the pseudo noise code generator 120 and the local frequency generated in the local oscillator 130, thereby outputting the mixed result as the pseudo noise code generated in the receiver itself.

In operation, the delay code generator 10 delays the pseudo noise code outputted from the mixer 140 by the predetermined time δ and transmits the delayed pseudo noise codes to the first multiplier 30, and the fast code generator 20 generates the fast pseudo noise code preceding the pseudo noise codes outputted from the mixer 140 by the predetermined time δ and transmits the fast pseudo noise code to the second multiplier 40.

The first multiplier 30 mixes the received signal inputted and the pseudo noise code delayed by the predetermined time δ in the delay code generator 10 and outputs the mixed result to the first band-pass filter 50. The second multiplier 40 mixes the received signal inputted and the fast pseudo noise code preceding the pseudo noise codes by the predetermined time δ in the fast code generator 20 and outputs the mixed result to the second band-pass filter 70.

The first and second band-pass filters 50 and 70 band-pass filter the mixed signals in the first and second multipliers 30 and 40 and output the filtered signals to the first and second envelope detectors 60 and 80.

The first and second envelope detectors 60 and 80 detect the envelope values of the output signals from the first and second band-pass filters 50 and 70 and output the envelope values to the subtracter 90.

The subtracter 90 subtracts the envelope value detected in the second envelope detector 80 from the envelope value detected in the first envelope detector 60 and outputs the subtracted result value to the loop filter 100.

The loop filter 100 eliminates other signals over the band in the envelope difference signal outputted from the subtracter 90 and outputs the output signal to the voltage controlled oscillator 110. The voltage controlled oscillator 110 outputs the arbitrary oscillating frequency to the pseudo noise code generator 120 in accordance with the filtered signal in the loop filter 100.

The pseudo noise code generator 120 generates the pseudo noise code which is proportional to the phase of the oscillating frequency provided from the voltage controlled oscillator 110 and outputs the generated pseudo noise code to the mixer 140.

The mixer 140 mixes the local frequency provided from the local oscillator 130 and the generated pseudo noise code in the pseudo noise code generator 120 for adjusting the phase of the pseudo noise code outputted from the pseudo noise code generator 120 to thereby generate a final pseudo noise code and outputs the final pseudo noise code to the first and second multipliers 30 and 40, respectively.

As a result, the conventional synchronization tracking device in the CDMA receiver carries out correlation between the received signal and the pseudo noise code generated in the receiver itself and delayed by the predetermined time δ and between the received signal and the fast pseudo noise code preceding the pseudo noise code by the predetermined time δ, thereby obtaining energy values and calculates the energy value difference to adjust the phase of the pseudo noise code generated to be proportional to the phase difference between the two signals, thereby enabling accurate synchronization tracking and phase to be maintained.

Under the conventional synchronization tracking device in the CDMA receiver, however, the synchronization tracking method conducts the tracking for only a single path in a single synchronization tracking process, such that the information for another paths should be obtained in another synchronization tracking process. Therefore, the conventional synchronization tracking method has to carry out a repeated synchronization tracking in the mobile radio communication channel having a plurality of paths, with a consequence that the phase information and energy values for the plurality of paths can be obtained.

SUMMARY OF THE INVENTION

An object of the invention is to provide a synchronization tracking device and method in a code division multiple access (CDMA) receiver which is capable of obtaining channel tracking results and energy values for all paths existing in a time section corresponding to a delay profile during a synchronization tracking for an initial synchronization in a CDMA communication system to thereby carry out demodulation for a best path with the obtained result and continuously correcting the information of the corresponding path to thereby ensure a high performance of the receiver.

According to an aspect of the present invention, there is provided a synchronization tracking device in a code division multiple access (CDMA) receiver having a pseudo noise code generator, which comprises: a received signal buffer for temporarily storing a received data corresponding to N chips and oversampling the received data at four times chip speed to thereby output the oversampled result; a pseudo noise code buffer for temporarily storing pseudo noise codes generated in the pseudo noise code generator at a chip speed and outputting the stored pseudo noise codes sequentially in a chip unit, while adjusting the phase of the pseudo noise codes; a received signal shift register unit comprised of a plurality of shift registers for shifting in a sequential order the output data from the received signal buffer; a pseudo noise code shift register unit comprised of a plurality of shift registers for shifting sequentially in a chip unit the pseudo noise codes outputted from the pseudo noise code buffer; a multiplying unit comprised of a plurality of multipliers for correspondingly multiplying the received data outputted from the received signal shift register unit and the pseudo noise codes outputted from the pseudo noise code shift register unit; and an adder for adding the data outputted from each of the plurality of multipliers to output the added result as the phase information and energy value for one path.

According to another aspect of the present invention, there is provided a synchronization tracking method in a code division multiple access (CDMA) receiver, which comprises the steps of: oversampling received signals corresponding to a plurality of chips at a predetermined speed and sequentially storing the oversampled signals in a received signal shift register unit; sequentially storing pseudo noise codes generated in a pseudo noise code generator in a pseudo noise code shift register unit, in a chip unit; correspondingly multiplying the output data from the received signal shift register unit and the pseudo noise codes outputted from the pseudo noise code shift register unit by means of a plurality of multipliers; adding the data outputted from the plurality of multipliers and storing the added result as the phase information and energy value for one path; while moving the pseudo noise codes by a ¼ chip section to adjust the phase of the moved pseudo noise codes, repeatedly performing the above steps as many as the number of the pseudo noise code shift registers, thereby storing the phase information and energy values for all paths; and selecting the path corresponding to a largest value in the stored phase information and energy values for all paths and informing a demodulator of the selected path.

BRIEF DESCRIPTION OF THE ATTACHED DRAWINGS

FIG. 3 is a flowchart illustrating a synchronization tracking method of a code division multiple access (CDMA) receiver.

DETAILED DESCRIPTION OF PREFERRED EMBODIMENT

Hereinafter, an explanation of the construction and operation of a synchronization tracking device in a code division multiple access (CDMA) receiver according to the present invention will be in detail discussed with reference to accompanying drawings.

Figure 1:
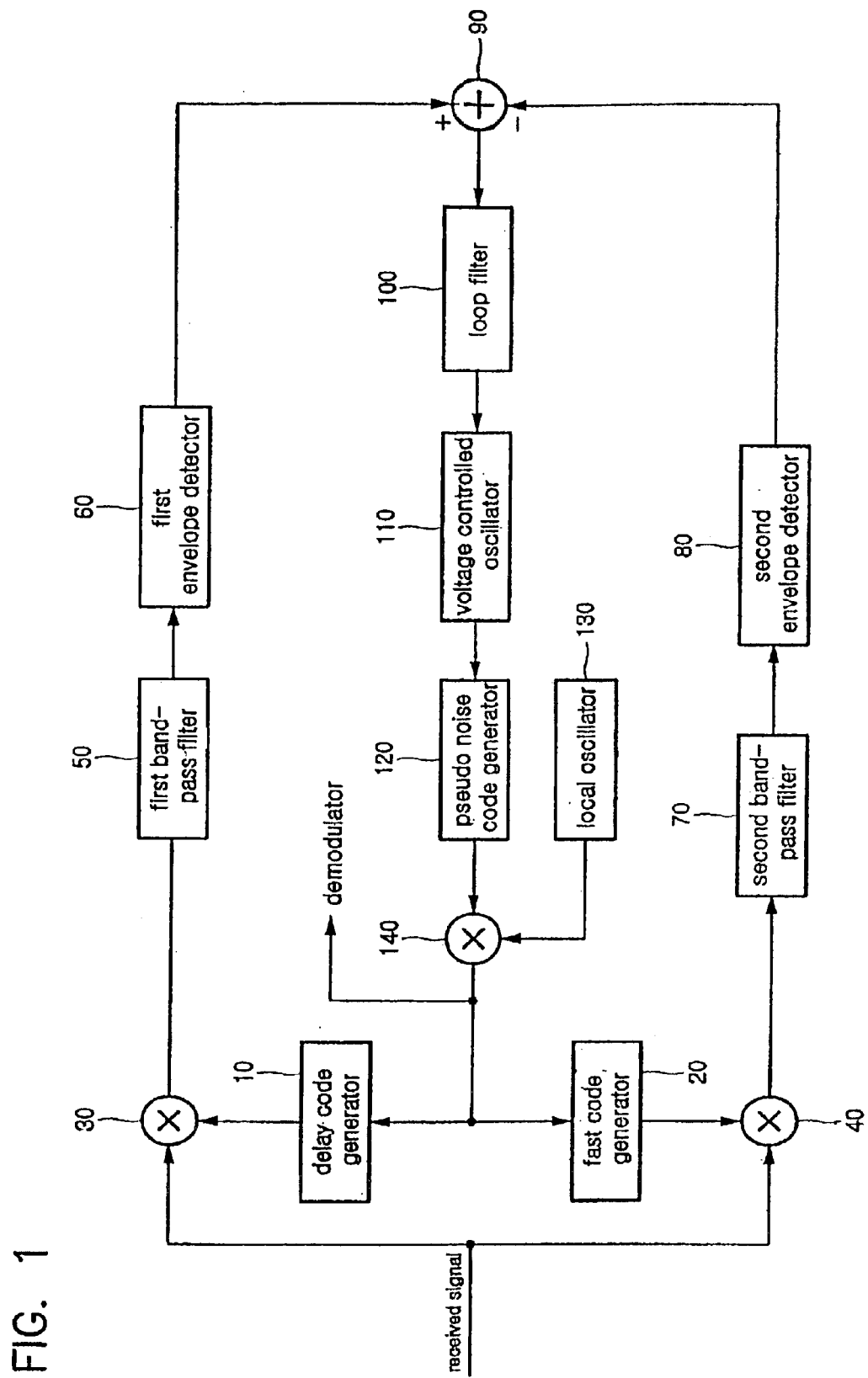
FIG. 1 is a block diagram illustrating the construction of a conventional synchronization tracking device in a code division multiple access (CDMA) receiver.
Figure 2:
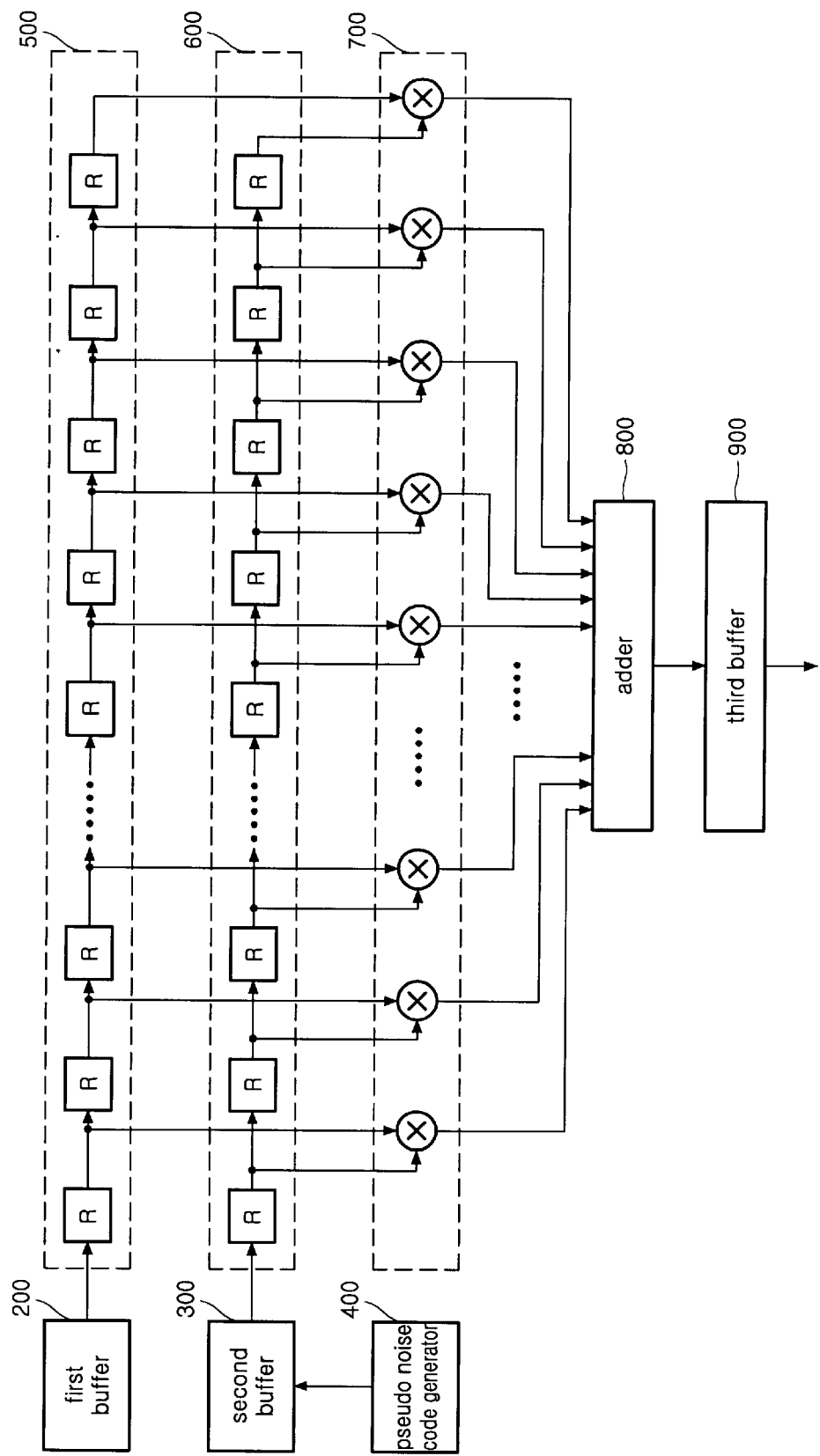
FIG. 2 is a block diagram illustrating the construction of a synchronization tracking device in a code division multiple access (CDMA) receiver according to the present invention.

In construction, as shown in FIG. 2, a reference numeral 400 represents a pseudo noise code generator for generating pseudo noise codes in the receiver itself, a reference numeral 200 represents a first buffer for temporarily storing input data (received signals), and a reference numeral 300 represents a second buffer for temporarily storing the pseudo noise codes generated in the pseudo noise code generator 400 at chip speed and adjusting the phase of the stored pseudo noise codes to output the adjusted pseudo noise codes. Also, a reference numeral 500 denotes a received signal shift register unit comprised of a plurality of shift registers R for shifting in a sequential order the output data from the first buffer 200 and a reference numeral 600 denotes a pseudo noise code shift register unit comprised of a plurality of shift registers R for shifting sequentially in a chip unit the pseudo noise codes outputted from the second buffer 300. In addition, a reference numeral 700 represents a multiplying unit comprised of a plurality of multipliers for correspondingly multiplying the received data outputted from the received signal shift register unit 500 and the pseudo noise codes outputted from the pseudo noise code shift register unit 600, a reference numeral 800 denotes an adder for adding the data outputted from the plurality of multipliers within the multiplying unit 700 to output the added result as the phase information and energy value for one path, and a reference numeral 900 denotes a third buffer for storing the added signal (the phase information and energy value) in the adder 800.

In operation, the received signals corresponding to N chips are first oversampled at four times chip speed and stored in each register in the received signal shift register unit 500 via the first buffer 200.

In this case, four continuous shift registers are established as one chip section, and each of the four shift registers stores four different oversampled data therein.

Then, the pseudo noise codes generated in the pseudo noise code generator 400 are stored in the second buffer 300 as the pseudo noise code buffer at chip speed and then, inputted sequentially in the chip unit to each shift register in the pseudo noise code shift register unit 600. At this time, only the pseudo noise codes corresponding to a designated integrating section are inputted.

If the pseudo noise codes corresponding to the designated integrating section have been inputted, the plurality of multipliers in the multiplying unit 700 each correspondingly multiplies the received data outputted from each of the shift registers in the received signal shift register unit 500 and the pseudo noise codes outputted from each of the shift registers in the pseudo noise code shift register unit 600.

The multiplied result value in each multiplier in the multiplying unit 700 is inputted and added to the adder 800, and then, the added result value is stored in the third buffer 900. The output value of the adder 800 is obtained by carrying out the correlation between the received signal and the pseudo noise code in a digital matched filter manner, which means the phase information and energy value for one path. In this case, the multiplying unit 700 and the adder 800 function as a matched filter.

If the phase information and energy value for one path have been stored through the above procedure, the above procedures as many as the number of the pseudo noise code shift registers are repeatedly carried out, while moving the pseudo noise codes by a ¼ chip section to adjust the phase of the moved pseudo noise codes, thereby storing the phase information and energy values for all paths.

As a result, the phase information and energy values for all paths during the time corresponding to the designated number of chip sections are obtained and stored in the third buffer 900.

If the phase information and energy values for all paths have been stored in the third buffer 900, using the stored phase information and energy values for all paths, a predetermined best path is selected and reported to a demodulator (which is not shown in the drawing).

After the synchronization tracking for all paths is completed at a time, a next synchronization tracking is carried out in the same manner as the previous synchronization tracking, such that the information for the selected path can be corrected.

Now, an explanation of the synchronization tracking method in the CDMA receiver according to the present invention will be discussed with reference to FIG. 3.

FIG. 3 is a flowchart illustrating a synchronization tracking method of a code division multiple access (CDMA) receiver.

First, the received signals corresponding to N chips are temporarily stored at step S101 and the pseudo noise codes generated in the pseudo noise code generator 400 of the receiver itself are temporarily stored and outputted, while adjusting the phase thereof at step S102.

At step S103, the received signals corresponding to the N chips outputted at the step S101 are oversampled at four times chip speed and stored in a chip unit in the received signal shift register unit 500 comprised of the plurality of shift registers.

At step S104, the pseudo noise codes outputted at the step S102 are inputted sequentially in the chip unit to the pseudo noise code shift register unit 600.

Next, at step S105 the received data outputted from each of the shift registers in the received signal shift register unit 500 and the pseudo noise codes outputted from each of the shift registers in the pseudo noise code shift register unit 600 are correspondingly multiplied.

At step S106, the multiplied result values at the step S105 are added to the adder 800 and then, the added result value is stored as the phase information and energy value for a corresponding path.

Then, at step S107 the above procedures as many as the number of the pseudo noise code shift registers are repeatedly carried out, while moving the pseudo noise codes by a ¼ chip section to adjust the phase of the moved pseudo noise codes, thereby storing the phase information and energy values for all paths.

Thereafter, at step S108 a path corresponding to a largest value in the phase information and energy values for all paths is selected and reported to the demodulator, thereby demodulating the selected path.

In conclusion, the conventional synchronization tracking device searches the phase for a single path and acquires the synchronization therefor, such that it should require a plurality of synchronization tracking processes for the purpose of acquiring the information for another paths.

When compared with the conventional synchronization tracking device, however, the synchronization tracking device in the CDMA receiver according to the present invention can acquire the phase information and energy values for all paths existing within a predetermined time section with the synchronization tracking at a time.

As clearly set forth in the foregoing, a synchronization tracking device and method in a CDMA receiver according to the present invention can acquire the phase information and energy values for all paths existing within a predetermined time section with the synchronization tracking at a time, whereby it provides the following advantages: the time necessary for the synchronization tracking can be reduced; and the information for a selected path can be continuously corrected, thereby improving the performance of the receiver.

What is claimed is:

1. A synchronization tracking method in a code division multiple access (CDMA) receiver having a pseudo noise code generator, a received signal shift register unit, a pseudo noise code shift register unit and a demodulator, said method comprising the steps of:

oversampling received signals corresponding to a plurality of chips at a predetermined speed and sequentially storing the oversampled signals in said received signal shift register unit;

sequentially storing pseudo noise codes generated in said pseudo noise code generator in said pseudo noise code shift register unit in a chip unit;

correspondingly multiplying the output data from said received signal shift register unit and the pseudo noise codes outputted from said pseudo noise code shift register unit by means of a plurality of multipliers;

adding the data outputted from said plurality of multipliers and storing the added result as the phase information and energy value for one path;

while moving the pseudo noise codes by a predetermined chip section to adjust the phase of the moved pseudo noise codes, repeatedly performing the above procedures as many as the number of pseudo noise code shift registers in said pseudo noise code shift register unit, thereby storing the phase information and energy values for all paths; and selecting the path corresponding to a largest value in the stored phase information and energy values for all paths and informing said demodulator of the selected path.

2. The synchronization tracking method as claimed in claim 1, wherein said predetermined chip section is set in such a manner that four continuous shift registers are established to on chip section.

3. The synchronization tracking method as claimed in claim 1, wherein said predetermined chip section is a ¼ chip section.

4. The synchronization tracking method as claimed in claim 1, wherein the pseudo noise codes sequentially inputted in the chip unit to said pseudo noise code shift register unit are the pseudo noise codes corresponding to a designated integrating section.

5. The synchronization tracking method as claimed in claim 2, wherein the four continuous shift registers each stores different oversampling data from each other.

* * * * *